United States Patent
Har et al.

(10) Patent No.: US 9,430,858 B1
(45) Date of Patent: Aug. 30, 2016

(54) DYNAMIC CARTOGRAPHY MAPPING SYSTEM

(71) Applicant: Amazon Technologies, Inc., Reno, NV (US)

(72) Inventors: Robin Kim Har, Seattle, WA (US); Lorian MacLean Kiesel Taylor, Bothell, WA (US); Vikram Gul Advani, Seattle, WA (US); Michael Christopher Wenneman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 56 days.

(21) Appl. No.: 14/030,537

(22) Filed: Sep. 18, 2013

(51) Int. Cl.
*G06T 11/20* (2006.01)
(52) U.S. Cl.
CPC .................................. *G06T 11/206* (2013.01)
(58) Field of Classification Search
CPC .... G06T 11/206; G06T 11/20; G06F 3/0481; G06F 17/246; H04L 41/11
USPC ......................................................... 345/440
See application file for complete search history.

(56) References Cited

U.S. PATENT DOCUMENTS 8,880,336 B2 * 11/2014 Van Os et al. ................ 701/412
9,063,951 B1 * 6/2015 Zhu .................... G06F 17/30902
9,105,039 B2 * 8/2015 Kramer .................. G06Q 30/02

OTHER PUBLICATIONS

"Thematic Mapping Engine" (by Bjørn Sandvik, MSc in Geographical Information Science 2008).*

* cited by examiner

*Primary Examiner* — Ke Xiao
*Assistant Examiner* — Gordon Liu
(74) *Attorney, Agent, or Firm* — Seyfarth Shaw LLP; Ilan N. Barzilay

(57) ABSTRACT

Theme-differentiated maps are generated from conventional two and three-dimensional mapping data. Dynamic cartography models are applied to the data to deliver maps with stylized topographies. In response to a search request from a client device for a map, points-of-interest within a geographic area resulting from the search are identified. Renderable representations of the points-of-interest are altered to differentiate the search results from other features in the geographic area. The resulting renderable representations are then transmitted to the client device for rendering.

20 Claims, 9 Drawing Sheets

DYNAMIC CARTOGRAPHY MAPPING SYSTEM

BACKGROUND

Internet-based maps have become ubiquitous. They are available via generic web browsers and using customized applications. In terms of appearance, they offer several improvements over traditional printed maps, such as providing photo-quality satellite and three-dimensional views, hybrids of traditional maps and photo-quality maps, and labeling routes and points-of-interest.

BRIEF DESCRIPTION OF DRAWINGS

For a more complete understanding of the present disclosure, reference is now made to the following description taken in conjunction with the accompanying drawings.

DETAILED DESCRIPTION

Figure 1:
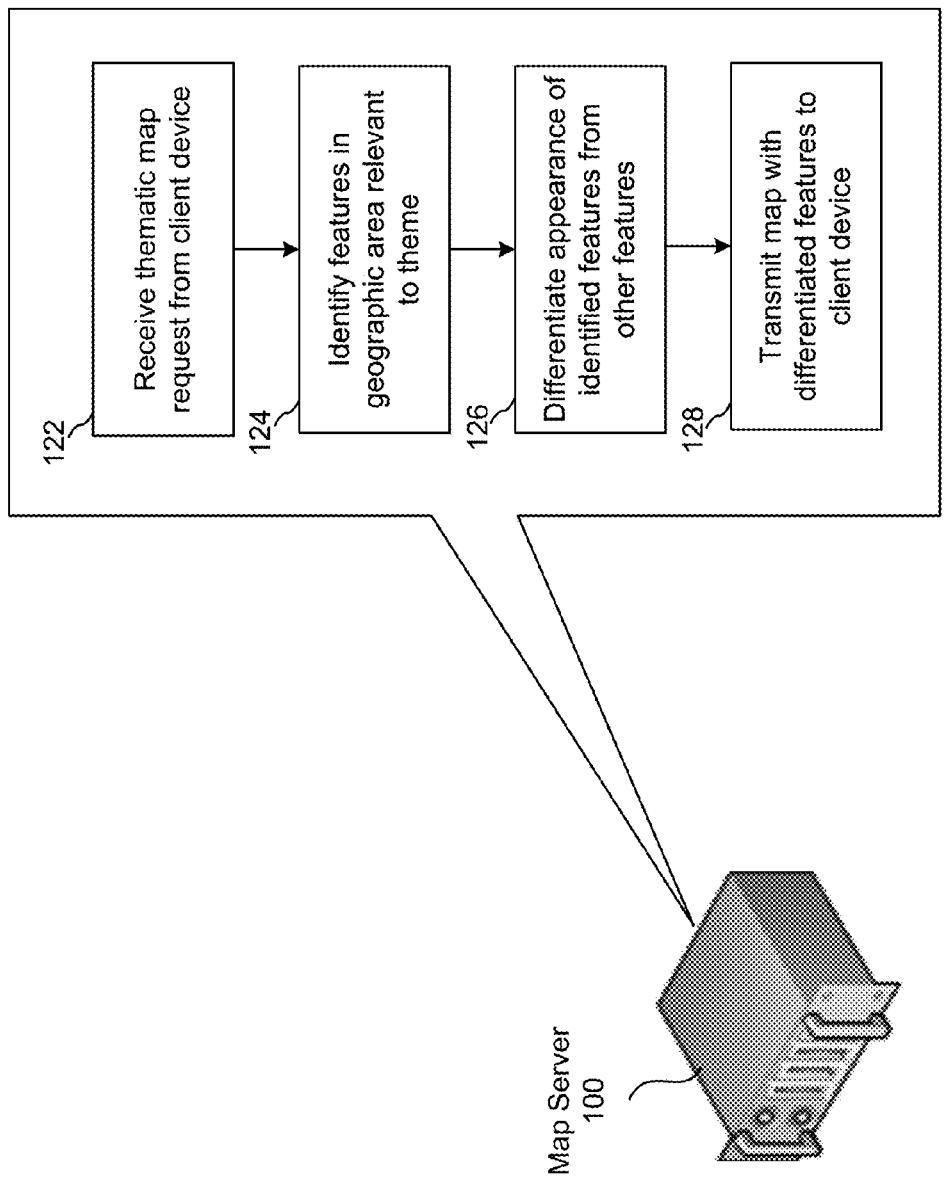
FIG. 1 illustrates a system for generating thematic maps with differentiated cartography.

Theme-differentiated maps are generated from conventional two and three-dimensional mapping data. Dynamic cartography models are applied to the data to deliver stylized topographies. Combined with user analytics, the resulting maps may be personalized to the interests and immediate needs of the individual user. Client-specific cartography models may also be used to deliver custom-stylized topographies for map-embedding on a client's own website.

Users may select from a list of thematic categories, such as "Night Out," "Fitness," "Shopping," "Tourist," etc., from which the entire cartography of the map may be personalized. Using conventional search techniques, the geographic region is searched, identifying potential locations and points-of-interest. Search results may be cross-referenced with user and social metrics, analyzing personal and aggregated data from online "check-ins," "likes," "favorites," and social connections to cull or weight the results, providing a data set highlighting locations and points-of-interest that will be of most interest to the individual user.

Map changes may be made in real time to highlight these locations and points-of-interest for each user. Each thematic category may dramatically alter the cartography of the map to better visualize the data pertaining to the particular user. For example, when a customer viewing "New York City" selects "Tourist," the colors of the map may change, landmarks such as the Empire State Building and Chrysler Building may be artificially enlarged, and new point-of-interest labels will appear to reflect historical sites and tourist destinations, with their font size and style differing based on popularity and social recommendations. General keyword search results and subcategory features (e.g., subcategories of "Night Out" may include "restaurants," "theaters," "nightclubs," etc.) added to a thematically stylized map may also be stylized. Conventional display of search results may also be used with a thematic map, where "pins" representing search result points-of-interest are overlayed on the stylized map.

A map generation engine (540 in FIG. 5, discussed further below) produces renderable, stylized maps from standard geo-data formats. Renderable data is data that may be rendered (i.e., compiled and displayed) on a device display. For example, the inputs to the map generator may include a stylized modeling profile along with conventional raw geo-data such as shapefiles, Keyhole Markup Language (KML), and other common formats. KML is a notation for expressing geographic annotation and visualization within Internet-based, two-dimensional maps and three-dimensional Earth browsers. A KML file specifies a set of appearance attributes and features (place marks, images, polygons, three-dimensional (3D) models, textual descriptions, etc.) for display in geospatial software implementing the KML encoding. KML is a standard of the Open Geospatial Consortium (OGC), an international voluntary-consensus standards organization, encouraging development and implementation of open standards for geospatial content and services, GIS (geographic information system) data processing and data sharing.

The stylized modeling profile is applied by the map generator to the raw geo-data, taking the coordinates, lines and polygons and producing a series of layers that may include, among other things, 3D buildings with real time lighting, terrain, ground cover (sidewalks, grass, etc.), road and transit networks, road labels, regional boundaries (countries, states, cities, neighborhoods), point-of-interest labels (parks, hospitals, restaurants, etc.), and/or interior floor plans.

Each modeling profile is an object-based script or schema that identifies which of the layers are to be stylized. For each of those layers, the modeling profile indicates one or more appearance attributes of the raw geo-data objects in a respective layer, and specifies how those attributes are to be modified to produce an altered renderable representation of one or more objects in a respective layer, to be used in producing a stylized map. Modeling profiles may also specify, among other things, search criteria for determining which objects are relevant to a thematic category associated with the modeling profile, and if-and-how metrics should be applied to search results and/or applied to altering renderable representations within a layer (discussed further below). Modeling profiles may also specify which stylized and un-stylized layers are to be included in rendering different map zoom depths.

The stylized modeling profiles may be based, at least in part, on cartography designs prepared by cartographers, editors and artists. Utilizing an editable framework, the modeling profiles provide different map "skins," customizing the graphical appearance and content to suit the purpose or topic of a particular map type.

Within the system, raw geographic data is sorted into "collections" based on map layer, and then stored in a database. The format in the database may be the same or similar to the raw data itself, composed of spatial data with associated attributes. Map layers may specify labels, polygons, physical structures, other physical entities, etc., with collections of map objects indexed spatially. Examples of physical structure and other such entities include buildings, parks, roller coasters, Ferris wheels (e.g., the London Eye), broadcast antenna towers, roads, hiking trails, rivers, lakes, train tracks, etc.

A tile generation process takes data objects corresponding to real-world structures and features within a given geographic area, as well as any polygon overlays and data objects corresponding to informational labels related to the structures and features, and applies the modeling profiles to this raw data, producing renderable objects. Renderable objects may comprise a triangulated 3D model, a layer-dependent compression scheme, and attributes to transfer to the end-user client for the client to render in a displayable format. Even objects that would be traditionally rendered in two dimensions (2D), such as labels and roads, may be represented in this manner as 3D objects. The renderable 3D objects may be polygons encoded to support a graphics rendering application programming interfaces (APIs), such as the multi-platform 3D interface of OpenGL, (an open standard API available on most operating systems), Microsoft Corporation's proprietary Direct3D, etc.

Several levels of shared resource matching and compression algorithms may be applied to reduce the resulting quantity of processed data. The packaging process assembles compressed renderables into "portals." Portals are groups of renderables that share the same layer and are of the same tile. Portals are the atomic object used in various client-side rendering algorithms. By batching renderables into portals, the client is able to process large numbers of models faster. The portals are then arrayed into a vector-tile, also known as a "drop." The drop is the unit of transmission from server to client. In addition to being sent to the client, a copy of the drop may be retained on the server.

Once downloaded to an end-user client platform such as a cellular telephone, tablet computer, or other device, a 3D renderer on the end-user client platform decompresses the vector tiles and produces an interactive 3D map by assembling the vector tiles in accordance with one or more background models. The 3D renderer may support, for example, renderable polygon objects encoded for the OpenGL or Direct3D APIs. The 3D renderer includes a core renderer that may render fully-textured buildings. The core renderer renders a current frame, prepares a next frame or frames, calculates what should be visible, and decompresses vector tiles. The background models may be streamed to the core renderer to facilitate unlimited map expansion and scrolling. The background models are sorted as they are downloaded and information geographically distant from an end-user's current map view and/or map depth may be adaptively culled to avoid memory overflow at the end-user's device.

Searches are supported at the server level. The search engine (530 in FIG. 5, discussed further below) may be, for example, a spatial Solr-based search for all forms of local data with distance filtering and multi-field sorting. Solr is an open-source enterprise search platform from the Apache Lucene project, and features full-text search, hit highlighting, faceted search, dynamic clustering, and database integration. The search implementation may be driven by two cores (indexes): a geo-name core that indexes cities, states, zipcodes, and landmarks, and a spatial core that indexes places, addresses, and intersections, with custom query filters based on a common geohash. A geohash is a latitude/longitude-based geographic coordinate data coding system that allows for adjustable precision (e.g., a particular location versus a general area). An end-user's query is first dispatched to the geo-name core to isolate the location of search. When that is complete, the remaining query fragments and/or thematic category are passed to the spatial index core to determine any search-specific keywords and identify locations and points-of-interest. Such a system enables flexible searching for neighborhoods, intersections, places, landmarks, cities, and more.

Results may be weighted and filtered by (among other things), the location being viewed, the current location of the end-user platform, an address or destination entered by a user, user metrics, social metrics, and/or the like. Addresses may be mapped to latitude and longitude via parcel data from municipalities, or road data/point addressing data from data acquisition partners (e.g., Navteq). If an exact address location is not available, address interpolation may be performed.

An editor may be used to create the modeling profiles (editor 542 in FIG. 5, discussed further below). The profiles can create maps ranging from satellite-quality realism to cartoon-like amusement parks. The modeling profiles may be composed in, among other things, an object-based scripting language such as JavaScript Object Notation (JSON). JSON is a text-based open-standard designed for human-readable data interchange. Objects in the raw geo-data are identified by their attributes, then styled by a modeling profile, modifying various "appearance" attributes. Examples of appearance attributes include geometric proportions of a polygon objects, road width and color, road "end-cap" style, road "join" style, road texture repetition, road label placement and spacing, intersection parameters, neighborhood opacity, opacity as a function of "Z-level" (i.e., altitude/height), the texture of terrain, and building lighting and textures (including lighting and textures as a function of time of day). The modeling profile may also specify to apply one or more rules, heuristics, and/or transforms to a layer (e.g., which features to include), and to particular parameters and attributes of the raw geo-data (e.g., modifying a shape or geometric proportions of a feature).

Because maps may exist at multiple depth levels (e.g., nationwide to street level), profiles may be set independently for each depth level. For example, vector-based objects may be made visible in multiple depth levels, instead of being limited to the conventional close-up zoom depths. As another example, which objects for each depth are rendered in vector form and which are presented as fixed representations (e.g., bitmaps) may be specified differently for different depths. How the map and represented vector objects transition between depth levels may also be specified.

Lighting and shading may also be specified in the modeling profile, with lighting and shading attributes being inherited by the background models sent to the end-user device to reassemble and render the vector tiles. The lighting and shading model may be dynamic and can be altered at run-time without the needs for model update or rebuilding at the end-user device.

FIG. 1 illustrates a system for generating thematic maps with differentiated cartography. A map server 100 receives a request for a thematic map from a client device (122). Features in a geographic area (e.g., the location of the device, a location already rendered on the client device, a location indicated in a query provided with the request, etc.) that are relevant to the theme are identified (124). A modeling profile associated with the theme is applied to feature data (126) to differentiate the identified features from other like-features on the map (e.g., differentiating the appearance of building identified as relevant to the theme from the appearance of other surrounding buildings). Map data including the differentiated features are then transmitted to the client device (128).

Figure 2A:
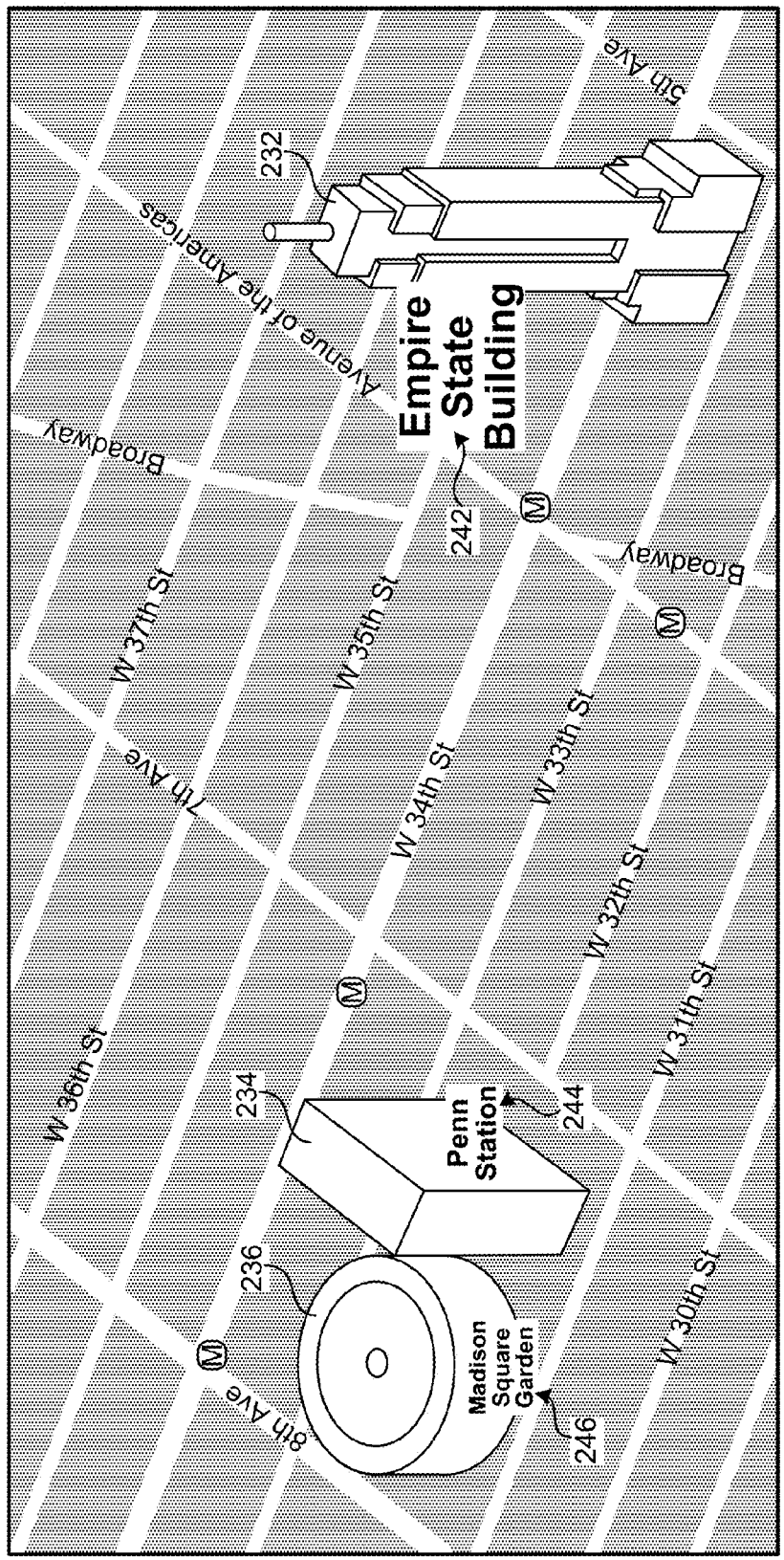
FIG. 2A is an example of a thematic map of a small geographic area.

FIG. 2A illustrates an example of a stylized map as it might be rendered on the client device. Such a map might be produced by a modeling profile associated with the "Tourist" thematic category. The streets and street widths are presented approximately to scale. Based on a search for the geographic area, three points-of-interest are identified: The Empire State Building (232), Penn Station (234), and Madison Square Garden (236). Unlike a conventional "Bird's Eye" view map, however, which would present 3D models of all of the buildings in the surrounding city scape and add marker or tags to the points-of-interest, the data for this map includes renderable representations for just the points-of-interest.

By individually manipulating the renderable representations for different objects in a given map layer, many stylized variations may be generated. For example, 3D renderable representations for all of the buildings and objects in the cityscape may be presented, but the scale of the points-of-interest may be increased to make them appear larger. For a given building or object, the change of scale may be proportional or disproportional. Disproportional scaling includes making a building taller without expanding proportions in other directions, or maintaining a normal scale at a base of a building while gradually expanding the polygons forming the representation with distance from ground level, resulting in buildings that expand disproportionately with height. Additionally, instead of omitting renderable representations as shown in FIG. 2A, other buildings might be rendered in 2D. Or the other buildings might be rendered smaller. Also, different shading may be applied to the points-of-interest in comparison to other buildings, such as rendering the points-of-interest in color and other buildings in greyscale, or applying photo-realistic textures to the points-of-interest while applying a less detailed textures to other buildings (e.g., applying a monochrome texture). Depending upon the particular look specified by the modeling profile, these features may be mixed-and-matched to achieve a wide variety of effects. Any layer may be stylized (e.g., replacing photo-realistic trees in a forest with a terrain texture composed of cartoon-like trees, exaggerating a scale of fountains, playgrounds, or ponds in parks), or exaggerating a scale of the terrain (e.g., making hills in a 3D rendering appear larger).

Although objects may be rendered with a 2D appearance, the 2D objects may be derived from the same 3D raw geo-data as the 3D objects (e.g., applying dimensional flattening or retaining only an object's lateral profile), and encoded for the same 3D API as the 3D renderable representations (i.e., even if the object is encoded to appear "flat," it may be encoded for the 3D API). Among other examples, roads may be 3D objects in the raw geo-data, but rendered as "flat" 3D renderable representations, and text labels may be encoded to appear as "flat" 3D renderable representations.

User and social metrics may be used to filter points-of-interest. For example, points-of-interest may not be rendered if a user of the client device (or their social network friends) has previously given the location a negative review. A threshold may be used to determine whether or not to include a point-of-interest, such as omitting any point-of-interest receiving an aggregated review no better than two-out-of-five "stars." This threshold may be dynamically set based on the number of points-of-interest found within the geographic area, balancing quality with quantity.

A modeling profile may also specify that metrics are to be applied to customize map cartography. For example, the scale of points-of-interest and/or associated labels may be altered based on individual or aggregated metrics. In FIG. 2A, the font sizes of the labels of Madison Square Garden (246), Penn Station (244), and The Empire State Building (242) are different based on aggregated metrics derived from online reviews of the locations. In this example, a larger font corresponds to a more popular destination. A similar graphical portrayal of a "weight" attributed to a feature may be used for any renderable representation. For example, if the proportions of buildings are altered to vary scale, the degree of variation may be set in accordance with a metric weight attributed to the building (e.g., more popular points-of-interest are rendered larger than less popular ones).

Different fonts may be specified to distinguish different features of a same layer, such as using different fonts to distinguish why a location may be a point-of-interest. For example, points-of-interest that are determined based on aggregated or social metrics (e.g., online reviews or places a user's social-network friends have indicated they have visited, "liked," or marked as a "favorite") may be labeled with one font, whereas points-of-interest associated with known interests of the particular user may be highlighted by using a different font. Particular interests may also be color-coded (e.g., locations that feature jazz music may be rendered in one color, whereas locations that feature pop music may be rendered in another color).

User interests may be determined using any number of data mining techniques, such as searching a user's purchase history for books that mention locations, indexing those locations in a database associated with a user's account or device, and comparing those locations within the geographic area of a map to be generated. User interest may also be associated with a client device identifier and available metrics collected based on an Internet access history associated with the device, as well as other techniques such as tracking cookies. Typically, however, user interests and access to their social network is based on a user of the client device having an account affiliated with the mapping service, the user self-identifying during the mapping session (e.g., by logging in, by having a persistent cookie associated with a subscribing web browser, by granting a mapping application on the user device access to social network accounts, etc.), and the user consenting to the collection of such data.

Figure 2B:
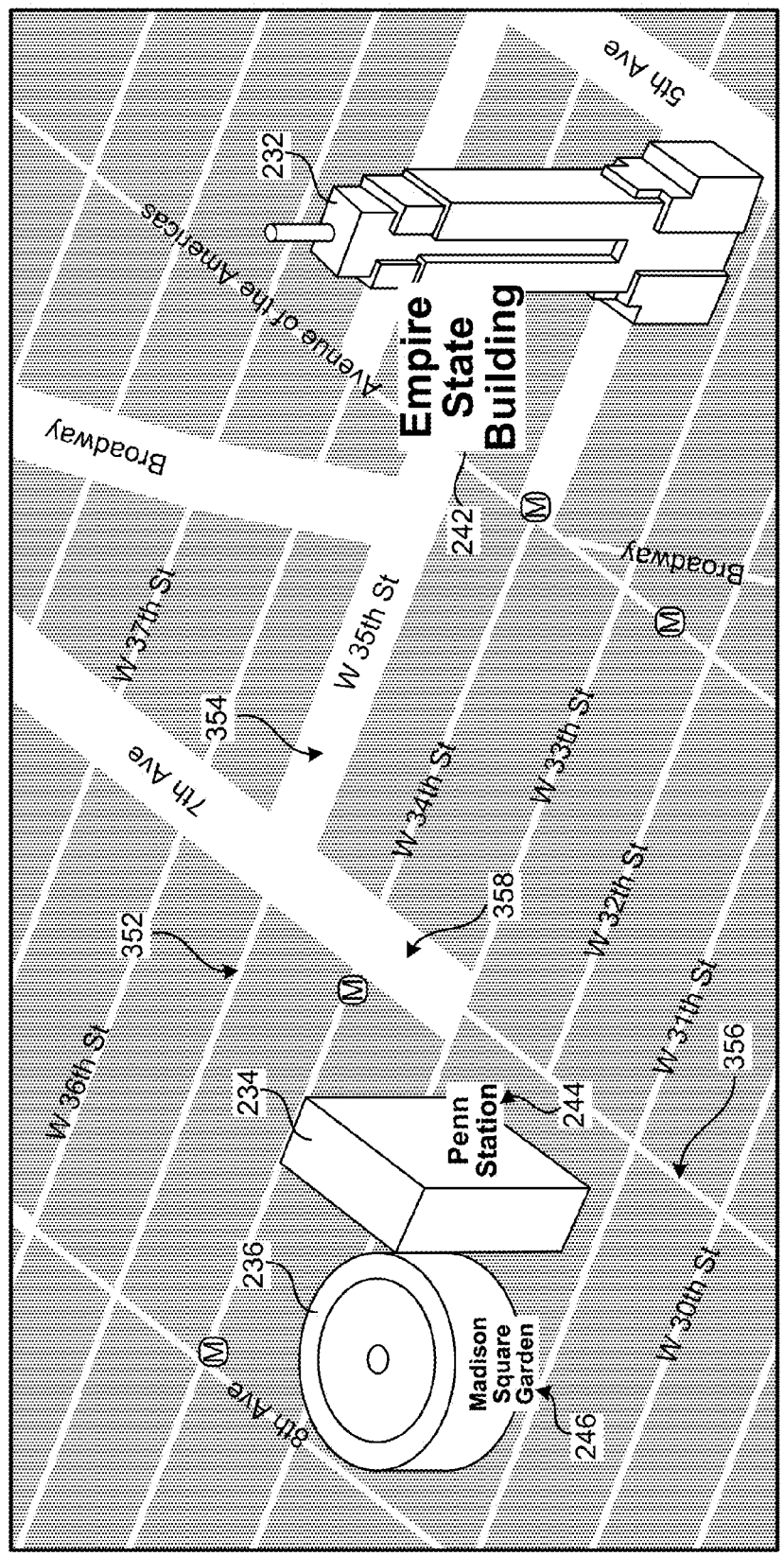
FIG. 2B is a further example of a thematic map of a small geographic area.

FIG. 2B illustrates another application of data metrics to distinguish map features. A modeling profile may specify to make changes to any layer of renderable map data. In this example, supplementing the map in FIG. 2A, weights are applied to the widths of roads, making portions of some roads narrower and other portions wider. For example, 7th Avenue below West 33rd Street is made narrower (356) than its actual scale (compare with FIG. 2A), whereas 7th Avenue above West 33rd Street is made wider (358). Likewise, West 35th Street is made narrower (352) west of 7th Avenue and wider (354) to the east. Other roads are similarly narrower (e.g., 8th Avenue, Avenue of the Americas) or wider (Broadway, 5th Avenue). A variety of data metrics may be used, such as aggregated online review scores or social networking recommendations for one or more of the respective buildings along the roads or for one or more of the occupants of the adjacent building, "walkability" scores, the density of stores or restaurants, reviews of the area (neighborhood, parkland, etc.), the availability of public wireless network access (e.g., free WiFi), etc. The degree of widening and narrowing may be determined by the relative score of the stretch of road, and the particular data metrics selected may be specified in the modeling profile. This form of adaptive highlighting may also be used to represent traffic conditions, to highlight a shortest or recommended path from location-to-location, to highlight "scenic routes" or "historic trails" specified in spatial geographic coordinate index data, etc. Other transit networks (e.g., trains, subway, and ferry routes) and pathways (e.g., hiking trails) may likewise be highlighted.

Figure 3:
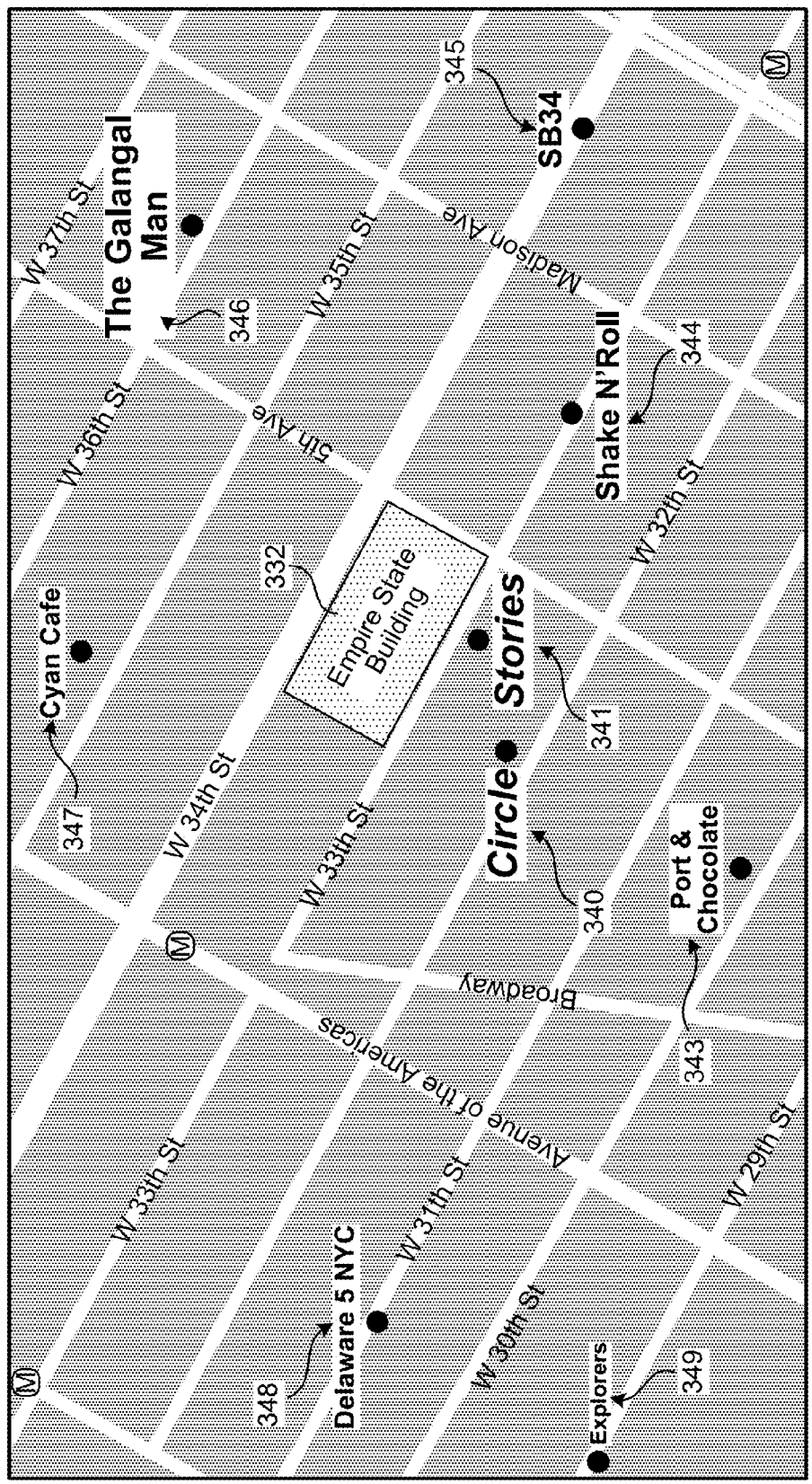
FIG. 3 is a map demonstrating the application of social-metrics conveyed via search result labels.

FIG. 3 illustrates application of data metrics and object scaling to an example "flat" map. The illustrated map might be the result of a search for "nightlife" near The Empire State Building. The map is approximately centered on a flat rendering (332) of The Empire State Building for the user's frame-of-reference, with multiple nightlife-related establishments denoted by dots on the map. The name labels adjacent to the dots (340 to 349) are rendered in a variety of font sizes, distinguishing the relative popularity of each establishment at a glance. Two establishments (Circle 340 and Stories 341) appear in italics, which may denote that the metrics are based on the personal social-network recommendations of friends of a client device's user, whereas the non-italicized labels (343-349) may indicate that generalized non-personal metrics are the sole source (e.g., aggregated online reviews).

Figure 4:
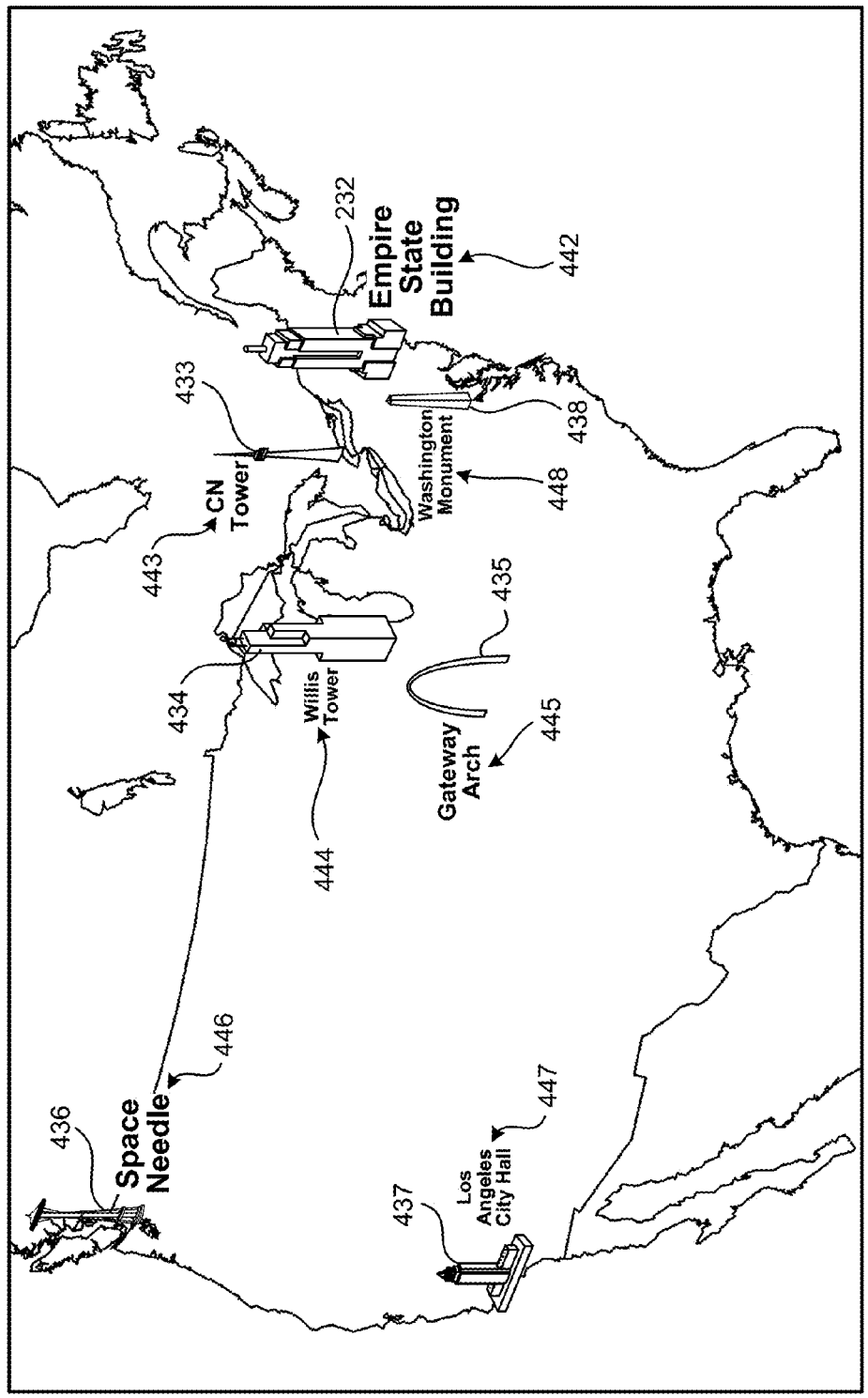
FIG. 4 is an example of a thematic map of a large geographic area.

FIG. 4 illustrates another stylized map. This map might result, for example, from a search of North America under the thematic category of "Tourist" for observation decks. A conventional map would show the content with a series of dots or markers denoting points of interest. Here however, since the scale of objects may be individually proportioned as specified in the modeling profile, a 3D representation of The Empire State Building (232), CN Tower (433), Willis Tower (434), The Gateway Arch (435), The Space Needle (436), Los Angeles City Hall (437), and The Washington Monument (438) are rendered. The model may specify to normalize sizes so that rendered buildings have approximately the same size, may specify to maintain their proportions relative to each other, may specify to apply metric weighting to determine proportions, etc. As discussed with FIGS. 2A, 2B, and 3, features may also be altered based on metric weighting and/or data source. In FIG. 4, the font size used for labels (442-448) varies in accordance with a data metric weight such as online reviews or social network recommendations.

Which points-of-interest are presented may be determined by applying one or more passes by pruning heuristics. For example, after identifying points-of-interest meeting the search criteria, spatial pruning may be applied to eliminate results in geographically close proximity (relative to map scale), retaining the result having a highest metric weight within a local cluster, so as to avoid a jumbled map. Further pruning may eliminate points-of-interest that have negative metrics or metrics below a threshold, dynamically setting the threshold based on the number of point-of-interest found within the geographic area, again balancing quality with quantity.

Figure 5:
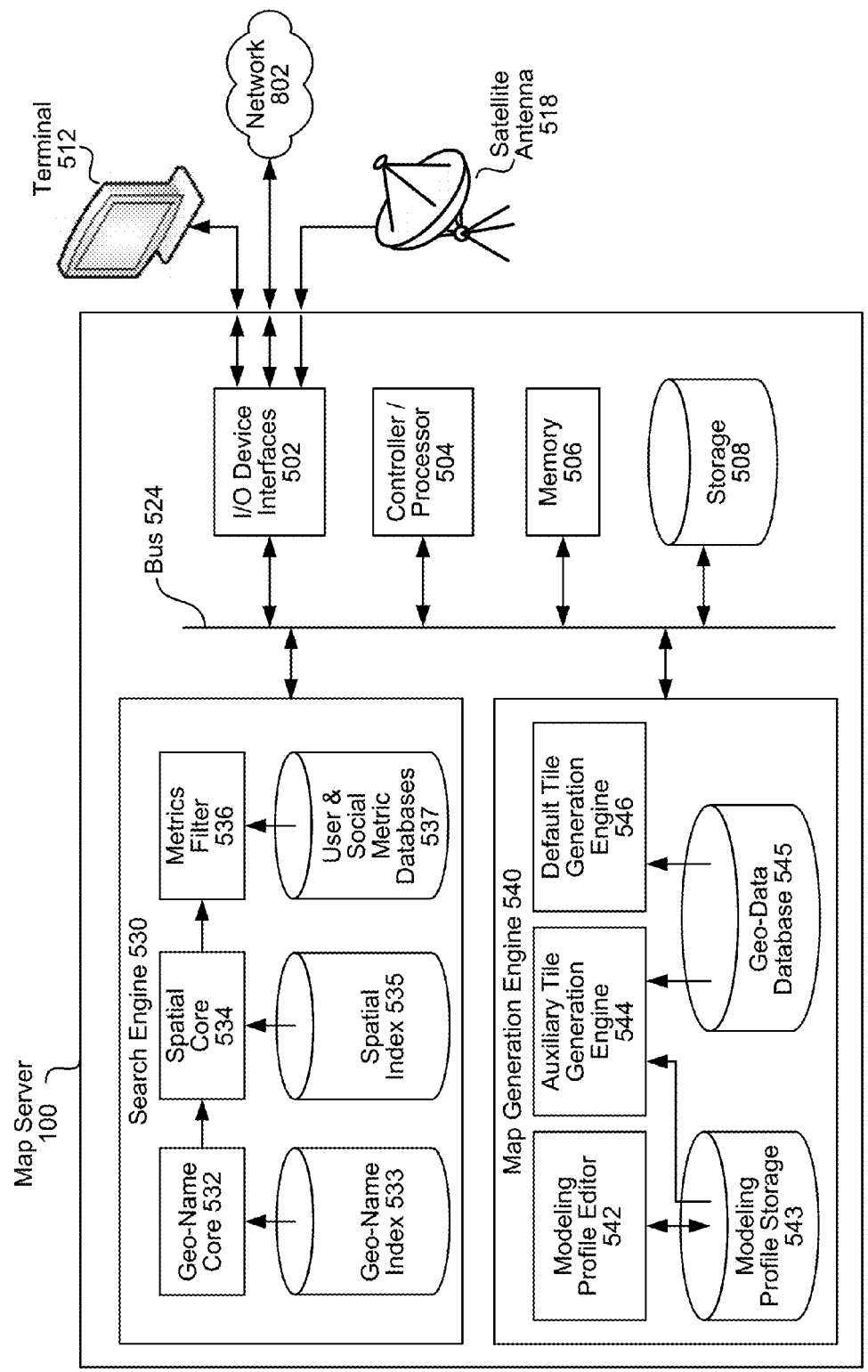
FIG. 5 is a block diagram conceptually illustrating a device for generating the thematic maps.

FIG. 5 is a block diagram conceptually illustrating the map server 100. An address/data bus 524 conveys data among the various components of the server 100. Each component within the server 100 may also be directly connected to other components in addition to (or instead of) being connected to other components across the bus 524.

Components include a controller/processor 504 that may each include one or more central processing units (CPUs) for processing data and computer-readable instructions, and a memory 506 for storing data and instructions. The memory 506 may include volatile random access memory (RAM), non-volatile read only memory (ROM) or flash memory, and/or other types of memory. Also included is a non-volatile data storage component 508, for storing data and instructions. The data storage component 508 may include one or more storage types of non-volatile storage such as magnetic storage, optical storage, solid-state storage, etc. Data and instructions may be selectively loaded into memory 506 from storage 508 at runtime, although instructions may also be embedded as firmware such as instructions stored the non-volatile flash or ROM.

Another component is input/output (I/O) device interfaces 502. A variety of input/output devices may be included with the server 100. Example input devices include a link to a terminal 512, a link to a network 802 such as the Internet, and a link to a satellite antenna 518.

The map server 100 includes a search engine 530 and a map generation engine 540. Multiple storage elements are illustrated, including a geo-name index 533, a spatial index 535, user and social metric databases 537, modeling profile storage 543, and geo-data database 545. In practice, some or all of these storage elements may be resident in the storage 508. Portions of storage elements may also be accessed via the network, such as social metric data obtained on an ad hoc basis as-needed.

The geo-name index 533, as described above, indexes cities, states, zipcodes, and landmarks. When a map request is received from a client device, geo-name core 532 determines the geographic area for the search. The location is then passed to the spatial core 534, along with any remaining query fragments and/or a specified thematic category, to determine any search-specific keywords and identify locations and points-of-interest. If a thematic category is invoked, spatial core 534 may query modeling profile storage 543 to determine if particular feature and point-of-interest criteria are specified by the associated modeling profile.

The resulting locations and points-of-interest determined by the spatial core 534 may then be filtered by a metrics filter 536, culling or weighting the search results based on data in user and social metric databases 537. Default criteria (e.g., based on user preferences) may be applied if no thematic category is specified. If a thematic category is specified, the metrics filter 536 may query modeling profile storage 543 to determine whether particular metrics are specified by the associated modeling profile. The results are passed to the tile generation engine 544 of the map generation engine 540.

Default tile generation engine 546 takes raw geo-data objects within a given geographic area and generates "generic" renderable representations. Prior to selection of a thematic category, the renderable map may be entirely based on these generic renderables.

As discussed above, when a thematic category or custom modeling profile is specified, the auxiliary tile generation engine 544 takes raw geo-data objects within a given geographic area and applies the modeling profiles to this raw data, producing stylized renderable objects.

Tile generation engines 544 and 546 may also render layers based on live data, such as traffic or weather (e.g., received via network 802 or satellite antenna 518). Several levels of shared resource matching and compression algorithms may be applied to the renderable objects to reduce the resulting quantity of processed data. The compressed output is bundled into vector tiles. The vector tiles may then be downloaded to rendering software running on end-user platforms such as telephones, tablet computers, and/or other devices.

Figure 6:
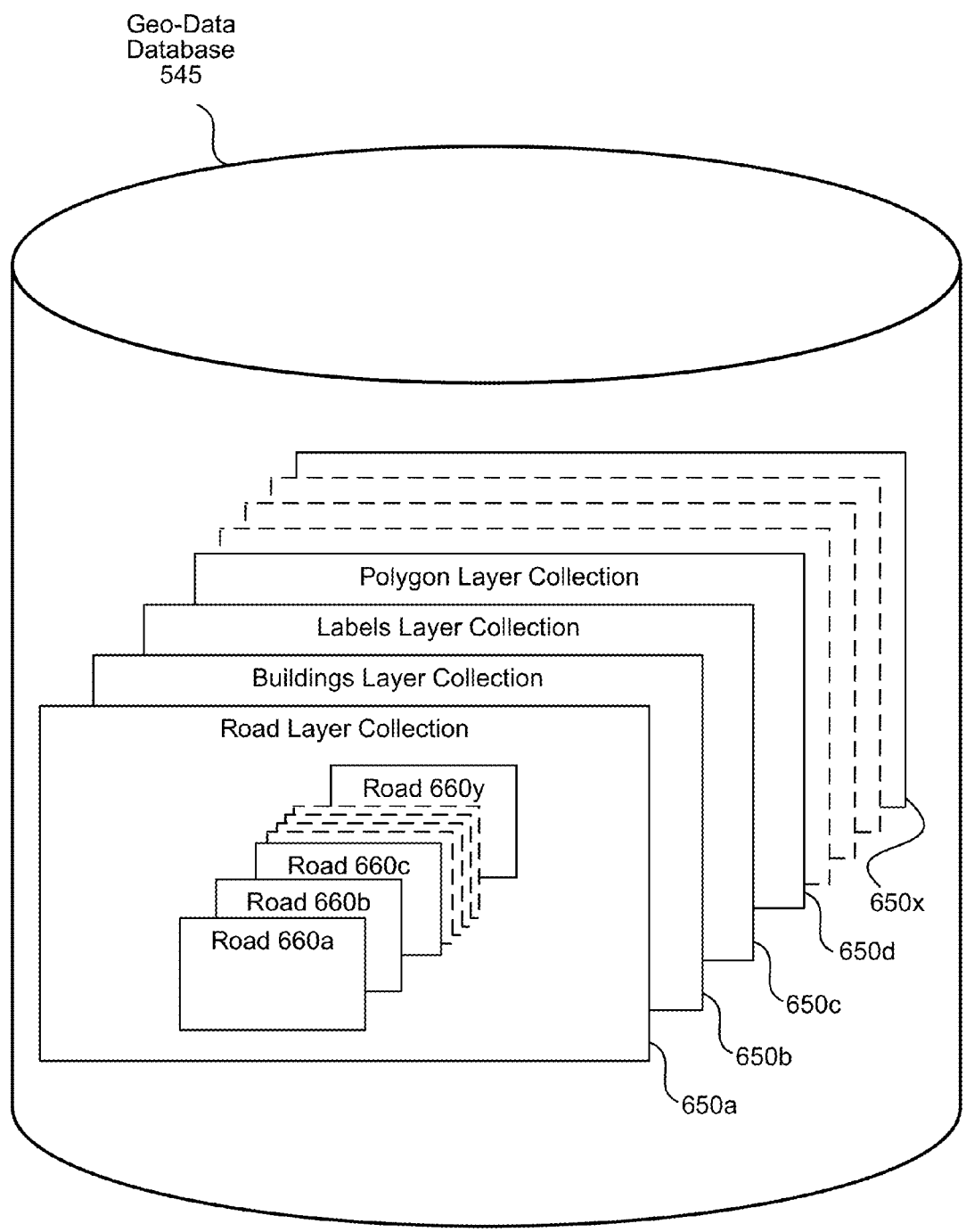
FIG. 6 illustrates a structure of a geographic data database.

The raw data is stored in geo-data database 545, which is further illustrated in FIG. 6. Raw geographic data is sorted based on map layer, such as a road layer, a buildings layer, a labels layer, a polygon layer, etc., and stored as collections 650*a-x* in the database 545. The format in the database may be the same or similar to the raw data itself, composed of spatial data with associated attributes. Map objects may be indexed spatially by geographic coordinate data, such as the spatially indexed road data 660*a-y* stored the road layer collection 650*a*.

Returning to FIG. 5, the auxiliary tile generation engine 544 applies the modeling profile from modeling profile storage 543 to the raw geographic data to produce renderable objects for transmission to the client device. If no thematic category is specified, an end-user device may render a map based entirely on tiles from the default tile generation engine 546, or a default modeling profile may be used, or a custom modeling profile may be applied for maps to be embedded in a client web page.

The auxiliary tile generation engine 544 and default tile generation engine 546 may coordinate tile generation to avoid generating tiles for a same layer, or may be independent. Stylized tiles from the auxiliary tile generation engine 544 may also be transmitted to the end-user device as a replacement for previously transmitted generic tiles for a same layer. An end-user device may optionally retain both the default and stylized tiles for a same layer, allowing rapid switching from a thematic style to the generic style at the client device without having to send a request for refreshed tiles to the server. Generic and/or stylized tiles may also be cached by the map generation engine 540 and reused across clients.

Modeling profile editor 542 is used to create and edit modeling profiles. Thematic categories may be linked to modeling profiles, and attributes of the modeling profiles may be used to determine available thematic categories. Thematic categories may be sent to the client device during each session (e.g., by a web server running on controller/processor 504 in conjunction with auxiliary tile generation engine 544), or if the client device is running a mapping-specific application, the thematic categories may be resident on the device as part of the application.

The modeling profile editor 542 may be accessible via a local terminal 512, as well as by remote devices connected via network 802. The editor may identify objects and object attributes in the raw geo-data stored in geo-data database 545, and provide a framework for editing those attributes to create a stylized look for each particular profile. Use of a human-readable data format such as JSON for the modeling profiles simplifies integration of new object layers and object attributes as they become available, since new attributes may be merged into existing profiles without modifying a profile's structure or appearance (e.g., turning new attributes "off" by default when they are merged into an existing profile). The modeling profile editor 542 may also associate or embed a modeling profile with one or more rules, heuristics, and/or transforms that configure a layer (e.g., which features to include), and/or configure particular parameters and attributes of the raw geo-data in a layer (e.g., modifying a shape or scale of a feature). These rules, heuristics, and transforms may be in a human-readable format that the tile-generation engine interprets at run-time.

Figure 7:
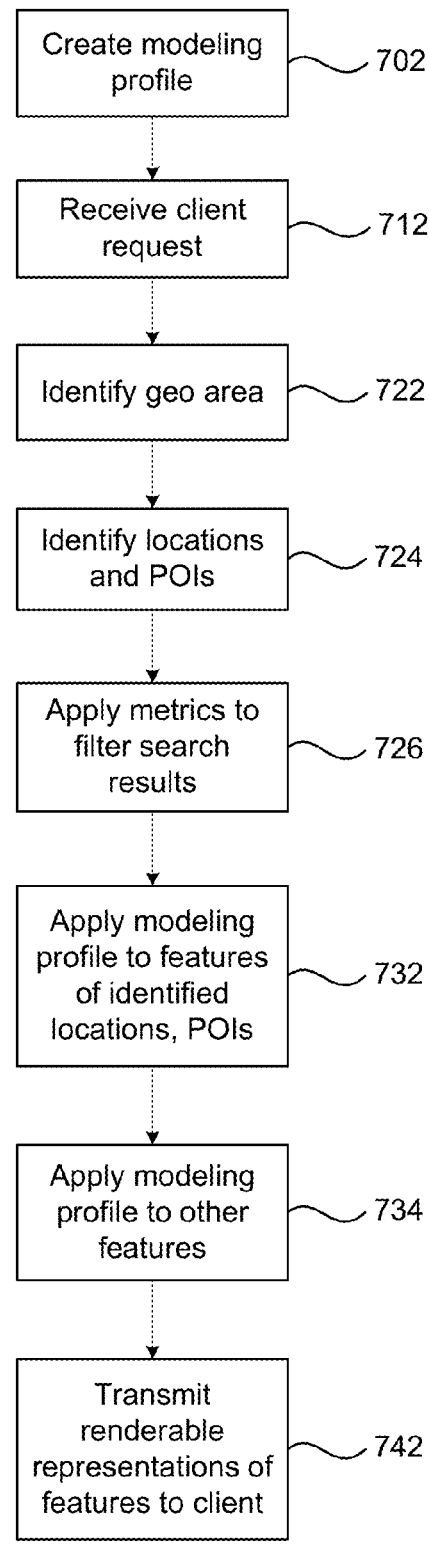
FIG. 7 is an example flow chart for generating the thematic maps.

FIG. 7 is a flowchart illustrating operations of the map server 100. One or more modeling profiles are created (702) using modeling profile editor 542. Each modeling profile may be associated with one or more thematic categories, such as "Night Out," "Fitness," "Shopping," "Tourist," etc., and specifies, among other things, if-and-how to modify appearance attributes of objects in the raw geo-data. For example, a modeling profile may specify alterations to appearance attributes such as geometric proportions of a polygon object, road width and color, road "end-cap" style, road "join" style, road texture repetition, road label placement and spacing, intersection parameters, neighborhood opacity, opacity as a function of "Z-level" (i.e., altitude/height), the texture of terrain, and building lighting and textures (including lighting and textures as a function of time of day). The modeling profile may also specify to apply one or more rules, heuristics, and/or transforms to a layer (e.g., which layer objects and features to include), and to particular parameters and attributes of the raw geo-data (e.g., modifying a shape or scale of a feature).

Because maps may exist at multiple depth levels (e.g., nationwide to street level), profiles may be set independently for each depth level. For example, vector-based objects may be made visible in multiple depth levels, instead of being limited to the conventional close-up zoom depths. As another example, which objects for each depth are rendered in vector form and which are presented as fixed representations (e.g., bitmaps) may be specified differently for different depths. How the map and represented vector objects transition between depth levels may also be specified.

Lighting and shading may also be specified in the modeling profile, with lighting and shading attributes being inherited by the background models sent to the end-user device to reassemble and render the vector tiles. The lighting and shading model may be dynamic and can be altered at run-time without the needs for model update or rebuilding at the end-user device.

Thereafter, the map server 100 receives a map request from a client device for renderable map data (712), invoking one of the modeling profiles. The request may take the form of, among other things, a text string, or a text string with metadata. The metadata may specify information relevant to the search such as the client device's current location (e.g., latitude and longitude) and/or indicate a particular thematic category. The thematic category may be explicitly specified/invoked in the client request (e.g., in the metadata), or may be extrapolated from the nature of the search parameters (e.g., if the search string includes keywords/phrases associated with a thematic category, such as "night life near . . . " or "amusement parks near . . . "). The end user's query is first dispatched to the geo-name core of the search engine 530, which may use the client device's location or apply 'single box' query parsing to the search string to identify (722) the geographic area for the map to isolate the location of search.

A default map "depth" level may initially be applied to determine the boundaries of the geographic area for the identified location, or if a modeling profile is either invoked or associated with keywords in the query, the modeling profile may specify an initial map depth, thereby determining the boundaries of the initial map for the geographic area.

Any remaining query fragments are then passed to the spatial index core 534 for additional analysis of the search keywords. This enables flexible searching for neighborhoods, intersections, places, landmarks, cities, and etc. The spatial core 534 identifies (724) Points-of-Interest ("POIs") within the geographic area. Metrics may then by applied (726) by the metrics filter 536 to cull or weight the POIs.

The type or types of metrics may be specified in the modeling profile. The tile generation engine 544 applies the modeling profile to set and/or modify appearance parameters and attributes of the renderable representations of the identified locations and POIs (732), setting a visual appearance of each location and POI. The appearance may be set, in part, based on the weights assigned by the metrics filter 536, if specified in the modeling profile. The tile generation engine 544 may also apply the modeling profile to the renderable representations of other features within the geographic area (734), setting a visual appearance of the other features. The renderable representations, with the appearance parameters and attributes set/modified by the modeling profile, are then transmitted to the client device (742) as renderable map data for display on the client device according to the appearance parameters and attributes.

Figure 8:
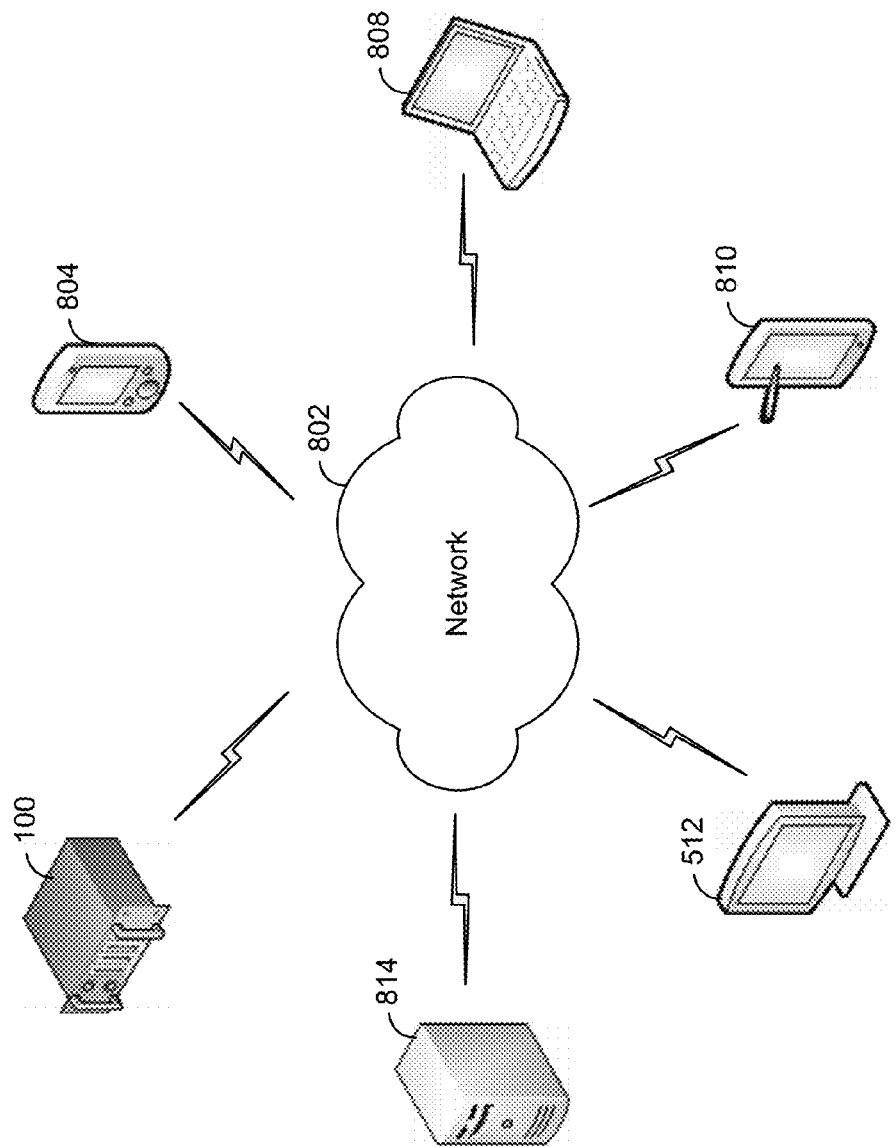
FIG. 8 illustrates an example of a computer network for use with the map generation system.

As illustrated in FIG. 8, multiple devices (512, 804-814) may be used with or contain components of the map server 100, or be connected to the map server as a client device or to edit modeling profiles. These devices may be connected over the network 802. Network 802 may include a local or private network or may include a wide network such as the Internet. Devices may be connected to the network 802 through either wired or wireless connections. For example, wireless device 804 may be connected to the network 802 through a wireless service provider. Other devices, such as computer 814, may connect to the network 802 through a wired connection. Other devices, such as laptop 808 or tablet computer 810 may be capable of connection to the network 802 using various connection methods including through a wireless service provider, over a WiFi connection, or the like.

The client end-user device may be executing a mapping application configured to render vector-based mapping data, or support web-browser based rendering of the vector-based mapping data. However, the map server may also be configured to transmit the map in either tiled or complete form in a non-scalable format, such as delivering bit-mapped based images to a web-browser or other application that does not provide support for vector-based mapping data.

Some components that are illustrated in the map server 100 as a single component may also appear multiple times in a single device. For example, the map server 100 may include multiple input/output device interfaces 502 or multiple controllers/processors 504. In certain configurations, the modeling profile editor 542 may be on one or more systems separate from the map server 100, with the modeling profiles being transmitted to the map server 100 from the separate systems.

The systems, processes, and algorithms disclosed herein may be implemented in various combinations of software, firmware, and/or hardware. For example, the systems and algorithms illustrated in FIGS. 1 and 7, as well as the components of search engine 530 and map generation engine 540 may be implemented by controller/processor 504 executing code retrieved from non-volatile storage 508, 533, 535, 537, 543, or 545, or a non-volatile variation of memory 506 (e.g., Flash, ROM).

The map server 100 may also be a component of other devices or systems that may provide Internet-based services, including a general-purpose computing systems, server-client computing systems, mainframe computing systems, telephone service provider computing systems, laptop computers, etc.

FIG. 5 illustrates a number of components that may be included in the map server 100, however other non-illustrated components may also be included. Also, some of the illustrated components may not be present in every device capable of employing the general concepts of dynamic cartography map generation.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A method performed by a dynamic cartography system configured to interactively support mapping services on a client device connected to the system via a network, the method comprising:

determining a plurality of thematic categories, each corresponding to a respective associated modeling profile stored in the dynamic cartography system;

receiving a request from the client device to provide a map based on one of a plurality of thematic categories, wherein the plurality of thematic categories and respective modeling profiles are determined prior to receiving the request;

identifying a geographic region based at least in part on the request;

identifying renderable representations of objects within the geographic region based on geographic coordinate data associated with the renderable representations, each renderable representation comprising a plurality of polygons and one or more attributes that define an appearance of the renderable representation;

identifying one or more points-of-interest within the geographic region that are associated with the thematic category of the request;

altering the one or more attributes that define the appearance of each renderable representation corresponding to the one or more points-of-interest, wherein the altering is based on the stored modeling profile associated with the thematic category of the request, and wherein the stored modeling profile is applied to emphasize the points-of-interest associated with the thematic category of the request relative to other renderable representations identified within the geographic region;

generating a renderable map data of the geographic region comprising an altered renderable representation corresponding to the one or more points-of interest and the other renderable representations; and transmitting data comprising the renderable map data to the client device.

2. The method of claim 1, wherein altering the one or more attributes of each renderable representation corresponding to the one or more points-of-interest comprises altering geometric proportions of the renderable representation or making the geometric proportions smaller or larger relative to original proportions specified by the one or more attributes that define the appearance of the renderable representation.

3. The method of claim 2, wherein the geometric proportions of each renderable representation corresponding to the one or more points-of-interest are altered based on review scores or social network recommendations relating to the respective point-of-interest, wherein the geometric proportions of renderable representations for points-of-interest with favorable review scores or recommendations are made larger than the geometric proportions of renderable representations of points-of-interest with less-favorable review scores or recommendations.

4. The method of claim 1, wherein altering the one or more attributes that define the appearance of each renderable representation corresponding to the one or more points-of-interest comprises applying one or more rules, heuristics, or transforms associated with the thematic category of the request to alter at least one of the attributes that define the appearance of the respective renderable representation of the one or more points-of-interest.

5. A computing device, comprising:
at least one processor; and
a memory device including instructions operable to be executed by the at least one processor to perform a set of actions, configuring the at least one processor to:
  determine a plurality of thematic categories, each corresponding to a respective associated modeling profile stored in the dynamic cartography system;
  receive a request from a client device to provide renderable map data based on one of a plurality of thematic categories, the request specifying a geographic region, wherein the plurality of thematic categories and respective modeling profiles are determined prior to receiving the request;
  identify at least one object within the geographic area associated with the thematic category of the request based on geographic coordinate data; and
  alter a renderable representation comprising three-dimensional polygons of the identified at least one object based on the stored modeling profile associated with the thematic category of the request, wherein an appearance of the identified at least one object is made different from that of another object to be included in the renderable map data representing the geographic area, wherein the other object is not associated with the thematic category of the request.

6. The computing device according to claim 5, wherein the instructions to alter the renderable representation configure the at least one processor to apply the stored modeling profile associated with the thematic category of the request to each renderable representation of the identified at least one object, modifying the appearance of each renderable representation of the at least one object, the modeling profile comprising one or more rules, heuristics, or transforms to modify an appearance of a renderable representation.

7. The computing device according to claim 5, wherein the renderable map data comprises the altered renderable representations of the identified at least one object in three dimensions, and includes a renderable representation of the other object in two dimensions.

8. The computing device according to claim 5, wherein the renderable map data comprises the altered renderable representations of the identified at least one object in three dimensions and a renderable representation of the other object in the geographic area in three dimensions, and wherein:
a first scale of the renderable representation of the other object is a same as that of other renderable features to be included in the renderable map data, and
a second scale of the altered renderable representations of the identified at least one object is larger than the first scale.

9. The computing device according to claim 5, wherein the at least one object comprises a plurality of physical structures, wherein geometric proportions of the renderable representation of each of the plurality of physical structures are increased in proportion to review scores or social networking recommendations associated with the respective physical structure.

10. The computing device according to claim 5, wherein the at least one object is a plurality of objects, the renderable map data further comprising a plurality of text-based labels, each identifying one of the plurality of objects, and the processor being further configured to scale a size of each text-based label in proportion to review scores or social networking recommendations for a point-of-interest associated with the respective object.

11. The computing device according to claim 5, wherein the at least one object is a portion of at least one road, trail, or transit network, wherein the instructions to alter the renderable representations configure the processor to:
  alter the renderable representation of the portion to increase a first width of the renderable representation of the portion by increasing at least one geometric dimension of the three-dimensional polygons, relative to a second width of a renderable representation of at least one other road, trail, or transit network included in the renderable map data, wherein the at least one other road, trail, or transit network not associated with the thematic category; and
  include the altered renderable representation of the portion and the renderable representation of the at least one other road, trail, or transit network in the geographic area together with the renderable map data.

12. The computing device according to claim 11, wherein the first width of the portion of the at least one road, trail, or transit network associated with the thematic category is increased in proportion to review scores or social networking recommendations for one or more of:
  the portion, an area including the portion, and objects along the portion.

13. A non-transitory computer readable medium having stored thereon instructions to configure a computer to:
  determine a plurality of thematic categories, each corresponding to a respective associated modeling profile stored in the dynamic cartography system;
  receive a request from a client device to provide renderable map data based on one of a plurality of thematic categories, the request specifying a geographic region, wherein the plurality of thematic categories and respective modeling profiles are determined prior to receiving the request;
  identify at least one object within the geographic area associated with the thematic category based on geographic coordinate data; and
  alter a renderable representation comprising three-dimensional polygons of the identified at least one object based on the stored modeling profile associated with the thematic category of the request, wherein an appearance of the identified at least one object is made different from that of another object to be included in the renderable map data representing the geographic area, wherein the other object is not associated with the thematic category of the request.

14. The non-transitory computer readable medium according to claim 13, wherein the instructions to alter the renderable representation configure the computer to:
  apply the stored modeling profile corresponding to the thematic category of the request to each renderable representation of the identified at least one object, modifying the appearance of each renderable representation of the at least one object, the modeling profile comprising one or more rules, heuristics, or transforms to modify an appearance of a renderable representation.

15. The non-transitory computer readable medium according to claim 13, wherein the renderable map data comprises the altered renderable representations of the identified at least one object in three dimensions, and includes a renderable representation of the other object in two dimensions.

16. The non-transitory computer readable medium according to claim 13, wherein the renderable map data comprises the altered renderable representations of the identified at least one object in three dimensions and a renderable representation of the other object in the geographic area in three dimensions, and wherein:
 a first scale of the renderable representation of the other object is a same as other renderable features of to be included in the renderable map data, and
 a second scale of the altered renderable representations of the identified at least one object is larger than the first scale.

17. The non-transitory computer readable medium according to claim 13, wherein the at least one object comprises a plurality of physical structures, wherein geometric proportions of the renderable representation of each of the plurality of physical structures are increased in proportion to review scores or social networking recommendations associated with the respective physical structure.

18. The non-transitory computer readable medium according to claim 13, wherein the at least one object is a plurality of objects, the renderable map data further comprising a plurality of text-based labels, each identifying one of the plurality of objects, and the processor being further configured to scale a size of each text-based label in proportion to review scores or social networking recommendations for a point-of-interest associated with the respective object.

19. The non-transitory computer readable medium according to claim 13, wherein the at least one object is a portion of at least one road, trail, or transit network, wherein the instructions to alter the renderable representations configure the computer to:
 alter the renderable representation of the portion to increase a first width of the renderable representation of the portion by increasing at least one geometric dimension of the three-dimensional polygons, relative to a second width of a renderable representation of at least one other road, trail, or transit network included in the renderable map data, wherein the at least one other road, trail, or transit network not associated with the thematic category; and
 include the altered renderable representation of the portion and the renderable representation of the at least one other road, trail, or transit network in the geographic area together with the renderable map data.

20. The non-transitory computer readable medium according to claim 19, wherein the first width of the portion of the at least one road, trail, or transit network associated with the thematic category is increased in proportion to review scores or social networking recommendations for one or more of:
 the portion, an area including the portion, and objects along the portion.

* * * * *